United States Patent
Stirm

Patent Number: 5,349,752
Date of Patent: Sep. 27, 1994

[54] DUST COLLECTION

[75] Inventor: Michael Stirm, Oberursel, Fed. Rep. of Germany

[73] Assignee: Black & Decker Inc., Newark, Del.

[21] Appl. No.: 23,260

[22] Filed: Feb. 25, 1993

[51] Int. Cl.$^5$ .............................. B25B 1/00; A47L 9/00
[52] U.S. Cl. ......................................... 30/124; 30/475; 451/453; 83/100; 55/373; 55/376; 15/347; 15/349; 144/252 R
[58] Field of Search ................. 15/339, 347, 348, 349, 15/352; 30/124, 475; 51/170 PT, 270, 273; 55/361, 371, 373, 375, 376; 83/100; 144/252 R; 408/67; 409/134, 137

[56] References Cited

U.S. PATENT DOCUMENTS

| | | | |
|---|---|---|---|
| 4,241,505 | 12/1980 | Bodycomb, Jr. et al. | 83/100 |
| 4,285,309 | 8/1981 | Johansson | 30/124 |
| 4,299,605 | 11/1981 | Aiyama et al. | |
| 4,414,743 | 11/1983 | Pioch et al. | 30/124 |
| 4,967,516 | 11/1990 | Hoshino et al. | |
| 5,028,245 | 7/1991 | Stein et al. | 55/373 |
| 5,074,044 | 12/1991 | Duncan et al. | 30/124 |
| 5,094,000 | 3/1992 | Becht et al. | 30/475 |

FOREIGN PATENT DOCUMENTS 3528611 2/1987 Fed. Rep. of Germany.
3611747 10/1987 Fed. Rep. of Germany.

OTHER PUBLICATIONS

Bosch User Manual, dated Aug. 2, 1990 and Parts List, for PEX 125 AE Eccentric Disc Grinder.

*Primary Examiner*—W. Donald Bray
*Attorney, Agent, or Firm*—John D. Del Ponti; Dennis A. Dearing; Charles E. Yocum

[57] ABSTRACT

A dust collection bag 1 for a power tool comprises a box-like container 10 which is separable into two parts 11, 12 along a plane of the box-like container and the interfitting portions 13, 14 of the two parts are rigid. One part 11 which is suitably a rigid plastics moulding has means 15 for connecting the container to the power tool outlet and the other part 12 has at least part of its wall surface formed of filter material 12a. The parts 11, 12 may be hinged together 16 and have connection means 17, 18 for releasably connecting them to close the container (FIG. 1).

11 Claims, 2 Drawing Sheets

DUST COLLECTION

BACKGROUND OF THE INVENTION

This invention relates to dust collection and particularly to dust collection bags for power tools.

Power tools are well known which have means for collecting detritus produced during operation of the power tool, such as sawdust and wood chippings. Generally, such power tools include means for sucking up the dust which is channelled through an outlet into a dust bag attached to the power tool. Such dust bags are generally emptied by removing the bag from the dust outlet of the power tool and extracting the dust through the entrance to the bag. With such an arrangement it is sometimes difficult to remove the dust effectively and quickly.

It is an object of the present invention to provide an improved dust collection bag for a power tool in which the removal of the dust from the dust bag after it has been used is simplified and more efficient.

SUMMARY OF THE INVENTION

To this end, the invention provides a dust collection bag for a power tool having a dust outlet, comprising a box-like container separable into two parts along a plane of said container, the interfitting portions of the two parts being rigid, one part having means for connecting the container to a said power tool dust outlet and the other part having at least part of its wall surface formed of filter material, releasable connection means being provided on the two parts.

Preferably, the interfitting portions comprise rigid band-like parts and in one form the one part suitably comprises a rigid moulding of plastics material having a tubular inlet for attachment to a power tool dust outlet and the other part suitably comprises a rigid frame element supporting a fabric bag.

The two parts are preferably hinged together at one side but in an alternative form they may be completely separable, suitably being a press or snap fit together. Where the parts are hinged together at one side a snap or press fitting is suitably provided at the side opposite thereof.

In a preferred embodiment, the first part comprises a rigid moulding of plastics material having an integral tubular inlet for attachment to a said power tool dust outlet and including a band-like portion defining the interfitting portion thereof, and the other part includes a band-like frame element supporting a fabric bag which is hinged to the band-like portion of the one part at one side with interengaging clip means being provided on the interfitting portions at the side opposite the hinge.

The container is ideally generally rectangular in cross section being divided along a major plane thereof.

BRIEF DESCRIPTION OF THE DRAWINGS

In order that the invention may be more readily understood, reference will now be made to the accompanying drawings, in which.

DETAILED DESCRIPTION OF PREFERRED EMBODIMENT

Figure 2:
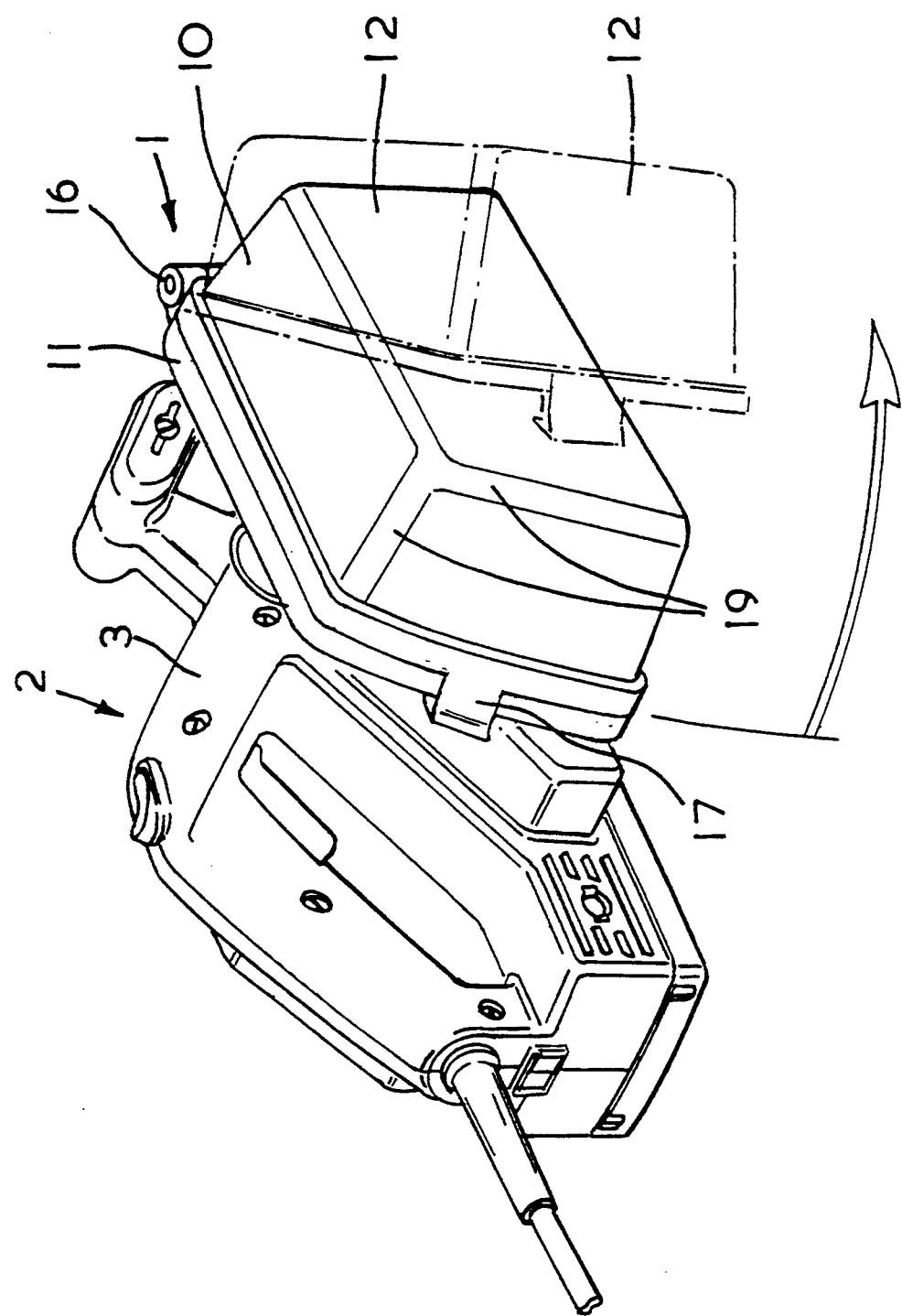
FIG. 2 is a similar view of the bag mounted on a power tool.

Referring now to the drawings, the dust bag 1 is shown in FIG. 2 attached to the dust outlet of an electrically powered planer 2 which during operation produces wood chippings and dust which are channelled through the housing 3 of the planar and out of the housing through a tubular outlet (not visible).

Figure 1:
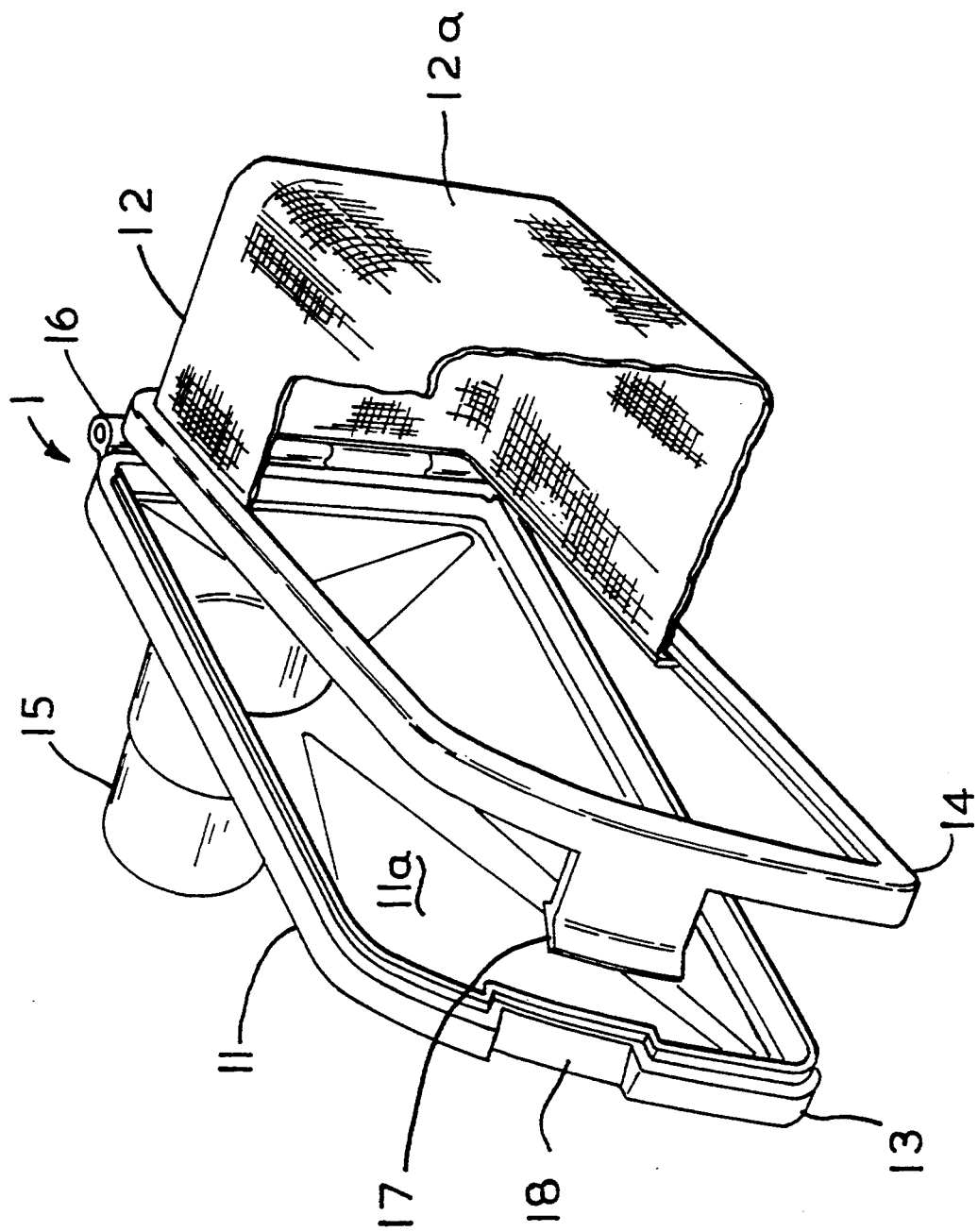
FIG. 1 is a partly sectioned perspective view of a dust collection bag according to the invention shown partly open.

The dust collection bag 1 comprises a box-like container 10 having the appearance of a rectangular solid which is separable into two parts 11, 12 along a major plane thereof, the major plane being a plane intersecting four generally parallel edges of the rectangular solid, and the interfitting portions 13, 14 of the two parts being rigid. The first part 11 has a tubular inlet 15 for connecting the container to the power tool dust outlet and the second part 12 includes a bag portion 12a of filter material which is air permeable. The two parts 11, 12 are hinged together along one side at 16 and can be closed to the position shown in FIG. 2 in which they are held together by a snap fitting 17, 18. The bag can be opened as shown in FIG. 1 and also by dotted lines in FIG. 2 for removal of dust collected in the bag.

The dust collection bag illustrated is generally rectangular in cross section and is divided through a major plane thereof. The first part 11 comprises a rigid moulding of plastic material including a wall portion 11a and a band-like portion 13. The tubular inlet 15 extends into a wall portion 11a and is integrally moulded therewith. The second part 12 comprises a rectangular band-like frame element 14 supporting a fabric bag portion 12a. As schematically illustrated in FIG. 2 the bag portion may be further supported by an additional frame structure 19.

The band-like interfitting portions 13 and 14 are hinged together along one side of the rectangular box-like container by hinge 16 and at the opposite of the container the bands are provided with interengaging connection means for releasably holding the container in its closed position and this suitably comprises a snap fitting consisting of a hook member 17 integrally moulded with the band 14 which snaps into a recess 18 in the band 13.

The tubular inlet 15 of the dust bag is a press fit on to the tubular outlet of the power tool although if desired some additional connection means may be provided to secure the bag in position.

The dust bag filter 12a may be removable and held in place in the frame 14 by a suitable clamp. In this way the filter 12a, which is suitably of paper, may be readily replaced when it is damaged or clogged.

As will be seen in the drawings the arrangement according to the invention by having the division between the parts 11, 12 in a plane of the box-like container 10 permits the bag to be opened up widely so that opening and clearing is faster and more efficient than with earlier constructions.

While the invention has been described above with reference to a specific embodiment, it will be understood that various modifications may be made to the specific details referred to herein. For example while the bag illustrated has a hinged section between the parts it should be understood that the parts may be releasably connected in other ways such as by being a press fit or snap fit together.

In the embodiment illustrated only the second part incorporates filter material. It will be understood, however, that while the first part should best be rigid it may incorporate filter material.

What is claimed is:

1. A dust collection bag for a power tool having a dust outlet, comprising a box-like container separable into two parts along a plane of said container, each part having an interfitting portion, the interfitting portions of the two parts being rigid, one part having means for connecting the container to said power tool dust outlet and the other part having at least part of its wall surface formed of filter material, and the two parts having releasable connection means for releasably connecting the two parts' interfitting portions to form the container.

2. A dust collection bag according to claim 1, in which the interfitting portions comprise rigid band-like parts.

3. A dust collection bag according to claim 2, in which said one part comprises a rigid moulding of plastics material having a tubular inlet for attachment to a power tool dust outlet.

4. A dust collection bag according to claim 2, in which said other part comprises a rigid frame element supporting a fabric bag.

5. A dust collection bag according to claim 1, in which said one part comprises a rigid moulding of plastics material having an integral tubular inlet for attachment to a said power tool dust outlet and including a band-like portion defining the interfitting portion thereof, and said other part includes a band-like frame element supporting a fabric bag which is hinged to the band-like portion of the one part at one side with interengaging clip means being provided on the interfitting portions at the side opposite the hinge.

6. A dust collection bag according to claim 1, in which the container is generally rectangular in cross section and has the appearance of a rectangular solid, the rectangular solid has four generally parallel edges, and the plane intersects the four parallel edges, thereby dividing the container into the two parts.

7. A dust collection bag according to claim 1, in which the two parts are hinged together at one side.

8. A dust collection bag according to claim 1, in which the two parts are a press or snap fit together.

9. A dust collection bag according to claim 2, in which the container is generally rectangular in cross section, and has the appearance of a rectangular solid, the rectangular solid has four generally parallel edges, and the plane intersects the four parallel edges, thereby dividing the container into the two parts.

10. A dust collection bag according to claim 2, in which the two parts are hinged together at one side.

11. A dust collection bag according to claim 2, in which the two parts are a press or snap fit together.

* * * * *